United States Patent

Fuss et al.

[11] Patent Number: 5,923,262
[45] Date of Patent: Jul. 13, 1999

[54] ADAPTIVE METHODS OF DETERMINING BLOCKAGE IN AN AIR SEEDER BLOCKAGE MONITORING SYSTEM

[75] Inventors: Trevor D. Fuss; Paul R. Bramel; Jason J. Wanner, all of Fargo, N. Dak.

[73] Assignee: Deere & Company, Moline, Ill.

[21] Appl. No.: 08/946,673

[22] Filed: Oct. 7, 1997

[51] Int. Cl.$^6$ .................................................. G08B 21/00
[52] U.S. Cl. ................................... 340/684; 56/DIG. 15; 111/903; 221/21; 377/21; 73/1.34; 73/1.36; 702/128
[58] Field of Search ................................... 340/684, 627, 340/674; 56/10.2 R, DIG. 15; 460/1; 111/903; 221/3, 8, 21; 377/21; 73/1.34, 1.36; 702/128

[56] References Cited

U.S. PATENT DOCUMENTS

| | | | |
|---|---|---|---|
| 4,307,390 | 12/1981 | Steffen et al. | 340/684 |
| 4,333,096 | 6/1982 | Jenkins et al. | 340/684 |
| 4,961,304 | 10/1990 | Ovsborn et al. | 56/10.2 R |
| 5,177,470 | 1/1993 | Repas | 340/684 |

*Primary Examiner*—Benjamin C. Lee
*Attorney, Agent, or Firm*—Arnold International; Bruce Y. Arnold

[57] ABSTRACT

Computer implemented methods for determining blocked and partially blocked conditions in the flow of particulate matter in an agricultural air seeding system are disclosed which automatically adapt for changes in seed type, seed density, fan rate or seed rate. In a first embodiment, the number of samples that are taken before making a determination of the blockage condition is varied depending on the number of seed events that have been detected in a given time interval. In a second embodiment, one or more criteria such as the maximum number of samples to wait for an event, the value a sensor filter must reach before the method determines a blockage sensor to be BLOCKED, or the value a sensor filter must reach when in the blocked state before the method determines the sensor is no longer blocked is varied depending on a smoothed value of the number of seed events that are detected per sampling period.

3 Claims, 5 Drawing Sheets

ADAPTIVE METHODS OF DETERMINING BLOCKAGE IN AN AIR SEEDER BLOCKAGE MONITORING SYSTEM

CROSS-REFERENCE TO RELATED APPLICATION

This invention is related in subject matter to the invention disclosed in U.S. patent application Ser. No. 08/883,853 entitled "AIR SEEDER BLOCKAGE MONITORING SYSTEM" filed Jun. 27, 1997 on behalf of John C. Thomas et al. now U.S. Pat. No. 5,831,542, the disclosure of which is hereby incorporated by reference.

BACKGROUND OF THE INVENTION

Prior art seed blockage monitors indicate that a seed blockage has occurred in a seed flow path if signals produced by seeds flowing in the path are not generated within a given time period, if the seed flow rate falls below a predetermined rate, or if the seed flow rate decreases a certain amount in a given time period or during a given distance traveled by the air seeder. Examples of such prior art systems include U.S. Pat. No. 4,079,362 to Grimm, U.S. Pat. No. 5,177,470 to Repas and U.S. Pat. No. 4,491,241 to Knepler et al.

BRIEF SUMMARY OF THE INVENTION

The present invention finds use in the apparatus of the above-mentioned related application and is directed to improved methods of determining from seed event data whether a seed flow blockage has occurred. Whereas the prior art methods of determining seed flow blockage require that the operator manually set the gain of the sensor system (s) or adjust a baseline criterion that determines when a seed blockage has occurred in order to adjust for seed type, seed density, fan rate or seed rate, the methods of the present invention are automatically adaptive to changes; in seed type, seed density, fan speed or seed rate and require no manual input. It is envisioned that one or more of the improved (i.e., adaptive) methods for determining whether a seed flow blockage has occurred may run concurrently with one or more algorithms that test for a seed flow blockage as in the prior art, i.e., by discerning whether a certain number of seed events in a given time period has occurred or whether a certain percentage reduction in seed events from a longer-term average or smoothing of seed events has recently occurred. Thus, the below methods enable the seed blockage monitor of the above-mentioned related application to more accurately detect any skips in seeding of one or more rows of crops that are being planted without need for operator input of seed type, seed density, fan speed or seed rate.

DESCRIPTION OF THE PREFERRED EMBODIMENTS

Figure 1:
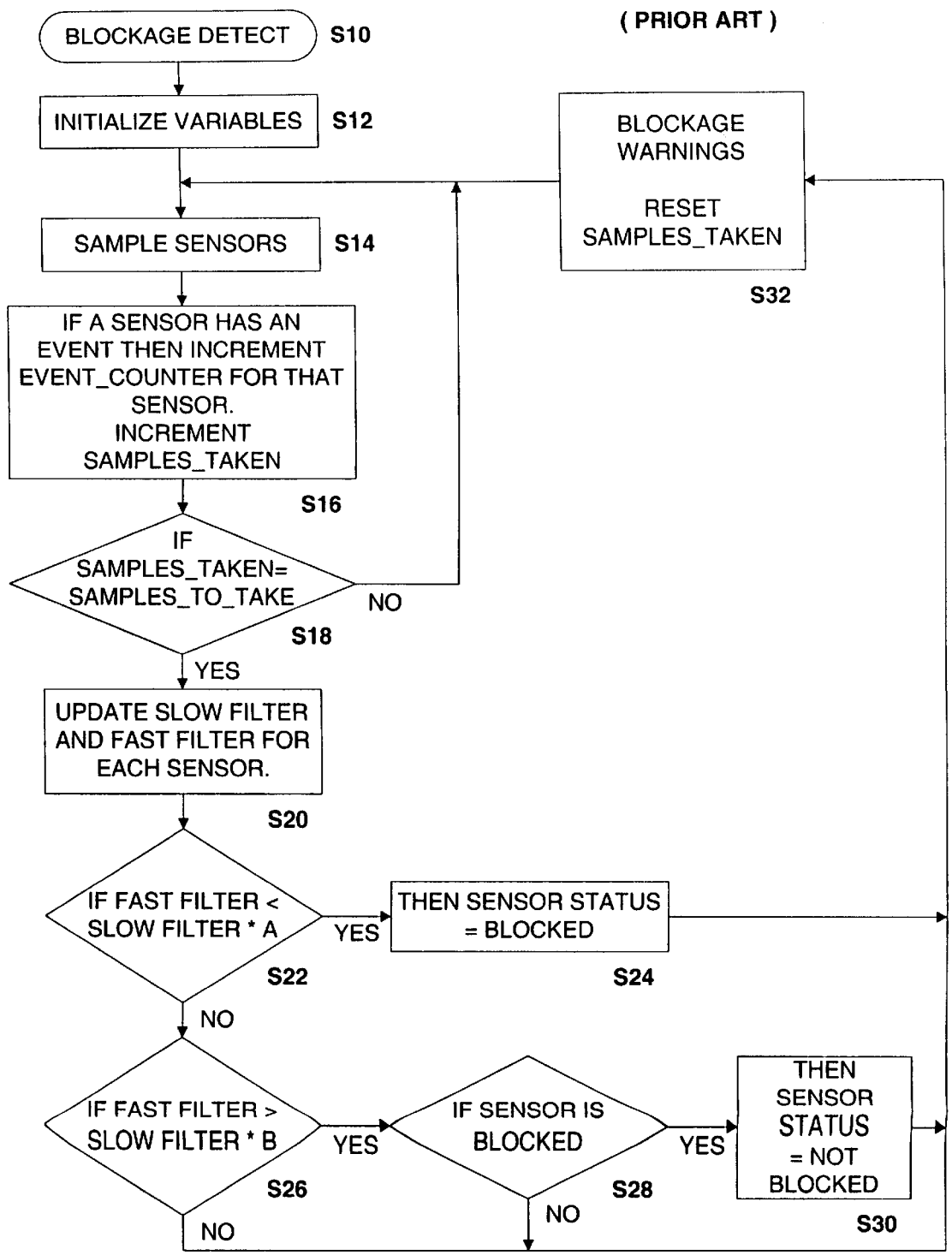
FIG. 1 is a flowchart diagram of a non-adaptive algorithm as used in the prior art for determining if seed flow blockage has occurred in a secondary seed tube. If seed flow has been reduced a certain amount below a longer-term running average or smoothing, it is deduced that a blockage has occurred.

FIG. 1 is a flowchart diagram of a non-adaptive algorithm as used in the prior art for determining if seed flow blockage has occurred in a secondary seed tube. If seed flow has been reduced a certain amount below a longer-term running average or smoothing of the data, it is deduced that a blockage has occurred. FIG. 1 illustrates what is termed herein as a sensor-based filtering algorithm in that it determines blocked and partially blocked states at various sensors (located at the secondary seed tubes of an air seeding system) and uses a fast and a slow digital low-pass filter to discern specified decreases in the rate of seed hits on the sensor so as to detect the blocked and partially blocked states.

A description of this prior art algorithm follows. Step 10 signals the beginning of the sensor based filtering algorithm of the air seeder blockage software. Control will proceed to step 12. In step 12 the variables are initialized, which include the Samples to Take, and the Samples Taken. The Samples to Take refers to the number of samples which must be taken for each sensor. In this example, Samples to Take equals 50. The Samples Taken refers to the number of samples for each sensor which have already been taken. At initialization the Samples Taken variable equals zero. The fast filter and slow filter values are also set equal to zero. Control will proceed to step 14.

In step 14 the blockage sensors are sampled to determine if an event occurred. Control will proceed to step 16. In step 16, if a blockage sensor has registered an event, then the event counter for that blockage sensor will be incremented by 1. In step 16 the Samples Taken variable is also incremented by 1. Control will then proceed to step 18.

Step 18 is a decision diamond which checks if the Samples Taken variable is equal to the Samples to Take variable (e.q., 50). If the Samples Taken variable is not equal to the Samples to Take variable, then control will return to step 14. If the Samples Taken variable is equal to the Samples to Take variable, then control will proceed to step 20. In step 20 the event counter value is used to update the slow filter and the fast filter for each blockage sensor. The slow filter and fast filter are digital low-pass filters. Previous filter values and the event counter value (e.g., the number of events detected in 50 samples) are used to calculate weighted averages for the current filter values, where the weighted average of the slow filter is influenced less by the event counter value than is the weighted average of the fast filter. Control will then proceed to step 22.

Step 22 is a decision diamond which checks if the fast filter value is less than the slow filter value multiplied by A (where A is a specified percentage value, e.g., 50 percent). If this is true, then it signifies that the fast filter value has dropped to at least 50 percent of the value of the slow filter and there has been a significant decrease in the number of events for a blockage sensor. Control will proceed to step 24, which signals that the blockage sensor is considered to be BLOCKED. Control will proceed to step 32.

Returning to step 22, if the fast filter value is not less than the slow filter value multiplied by A, then control will proceed to step 26. Step 26 is a decision diamond which checks if the fast filter value is greater than the slow filter value multiplied by B (where B is a specified percentage value, e.g., 90 percent) If this is true, then control will proceed to step 28. Step 28 is a decision diamond which checks if a blockage sensor registered previously as BLOCKED. If a blockage sensor previously registered as BLOCKED, but is no longer BLOCKED (from step 26), then control will proceed to step 30, where the blockage sensor status will be set to equal NOT BLOCKED. Control will then proceed to step 32. Returning to step 28, if a blockage sensor did not previously register as BLOCKED, then control will proceed to step 32. Returning to step 26, if the fast filter value is not greater than the slow filter value multiplied by B, then control will proceed to step 32.

In step 32, when the BLOCKED condition exists, blockage warning signals will be relayed to any user interface devices being employed by the system (e.g., display monitors, flashing LEDs). Where the NOT BLOCKED condition exists, blockage warning signals will be discontinued if previously being relayed. The Samples Taken variable is then reset to zero. Control will then return to step 14.

Figure 2:
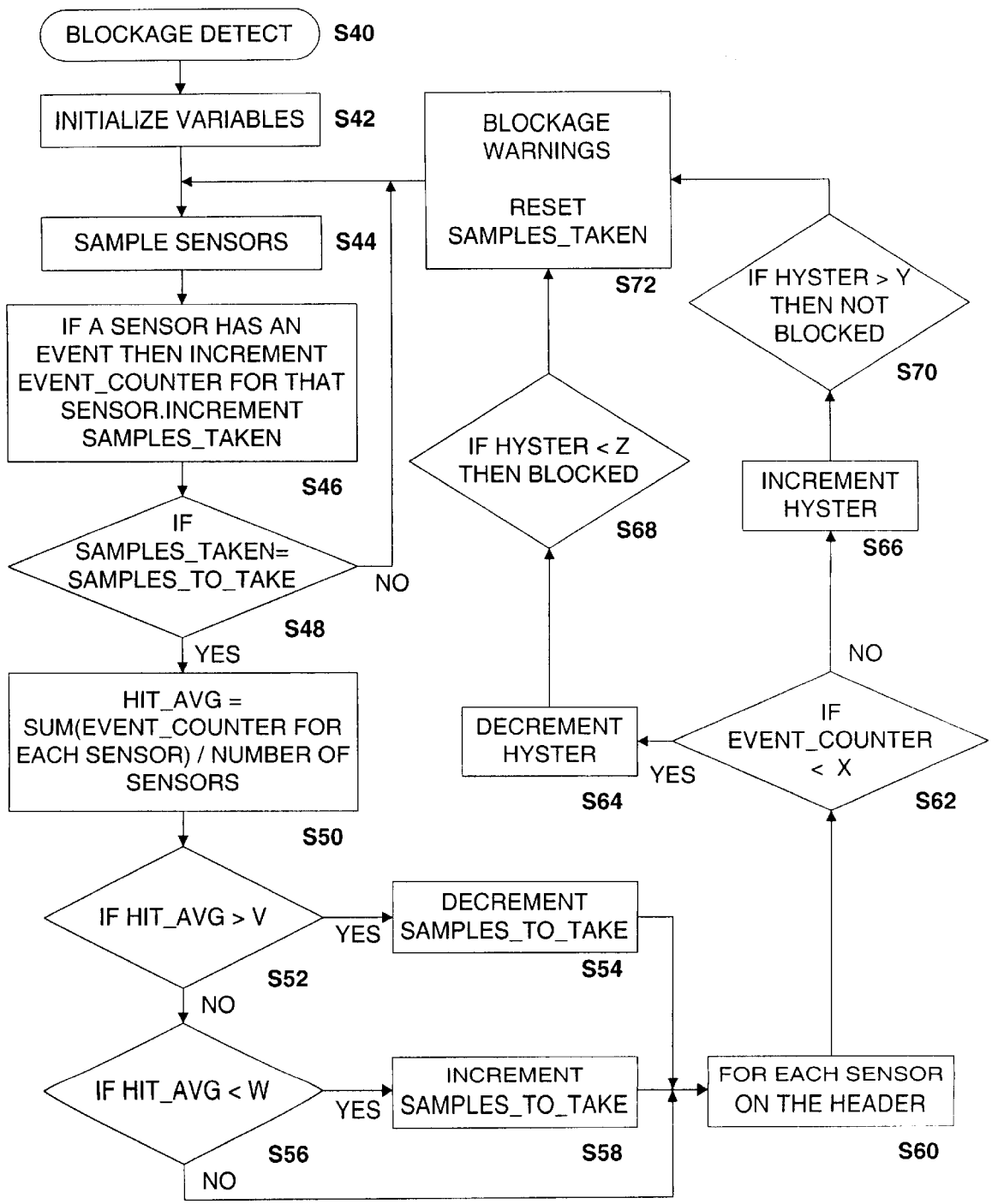
FIG. 2 is a flowchart diagram of an adaptive algorithm according to the first embodiment of the present invention. This algorithm is for determining if seed flow blockage has occurred in a secondary seed tube and uses the output of sensors that are positioned in respective secondary seed tubes, each of which receives its flow of seeds from the same primary seed tube.

FIG. 2 is a flowchart diagram of an adaptive algorithm according to a first embodiment of the present invention for determining if seed flow blockage has occurred. This algorithm is for determining if blockage has occurred in a secondary seed tube which feeds a header and is termed the "primary-based adaptive algorithm". This algorithm provides a method to determine blocked and partially blocked states in an air seeding system by averaging (or smoothing) events from all of a header's associated blockage sensors (e.g., piezoelectric sensors which are present in the secondary hoses attached to said header). As an example, if there are 10 secondary hoses attached to a header that are fitted with blockage sensors, and each blockage sensor is reporting 10 events every 3 seconds, the average or smoothed value for said header will be 10.

In FIG. 2, step 40 signals the beginning of the primary-based adaptive algorithm. Control will proceed to step 42. In Step 42 variables are initialized, which include the variables Hit Average, Samples to Take, and the Samples Taken. The variable Hit Average is defined as the average number of events (hits) for a certain header. At initialization Hit Average equals zero. The Samples to Take refers to the number of samples which must be taken for each sensor. In this example, Samples to Take equals 30. The Samples Taken refers to the number of samples for each sensor which have already been taken. At initialization, the Samples Taken variable equals zero. Control will proceed to step 44.

In step 44 the blockage sensors are sampled to determine if one or more seed events (i.e., a seed being detected by a sensor) has occurred. Control will then proceed to step 46. In step 46, if a blockage sensor has registered an event, then the hit counter for that blockage sensor will be incremented by 1. In step 46 the Samples Taken variable is also incremented by 1. Control will then proceed to step 48.

Step 48 is a decision diamond which checks whether the Samples Taken variable is equal to the Samples to Take variable. If the Samples Taken variable is not equal to the Samples to Take variable, then control will return to step 44. If the Samples Taken variable is equal to the Samples to Take variable, then control will proceed to step 50. Step 50 calculates the Hit Average by setting the Hit Average equal to the sum of the event counters, for each blockage sensor associated with the header, divided by the number of blockage sensors associated with the header. The variable Hit Average then gives the average number of events that have occurred for a certain header in a certain number of samples (corresponding to the Samples Taken variable, e.g., 30). Control will proceed to step 52.

Steps 52, 54, 56 and 58 are the heart of what make this algorithm adaptive to different seed types, seed densities, fan rates or seed rates. The adaptation is the result of the algorithm checking the Hit Average variable to determine if it is greater than V or less than W (where V and W are specified constants) and, if so, then decrementing or incrementing the Samples to Take variable, respectively. This provides a Hit Average close to a certain number (e.g., 4). Step 52 is a decision diamond which checks if the Hit Average is greater than V (e.g., V may equal 5). If the Hit Average is greater than V, then control will proceed to step 54. In step 54 the Samples to Take variable is decremented by 1. Control will then proceed to step 60. Returning to step 52, if the Hit Average is not greater than V, then control will proceed to step 56.

Step 56 is a decision diamond which checks if the Hit Average is less than W (e.g., W may equal 3). If the Hit Average is less than W, then control will proceed to step 58. In step 58 the Samples to Take variable is incremented by 1. Control will then proceed to step 60. Returning to step 56, if the Hit Average is not less than W, then control will proceed to step 60. Step 60 signals that steps 62–72 will be performed for each of the blockage sensors. Control will proceed to step 62.

Step 62 is a decision diamond which checked whether the event counter of each blockage sensor is less than X ( e.g., X equals 1). If the event counter is less than X, then control will proceed to step 64. In step 64, a variable for each blockage sensor termed Hysteresis Counter, which is initially set to a specified maximum value (Y+1) is decremented by 1 for that blockage sensor. The minimum value that the variable Hysteresis Counter for each sensor can attain is limited to a specified value (Z−1). (For example, Z may be set to equal 2.) Returning to step 62, if the event counter is not less than X (e.g., X equals 1), then control will proceed to step 66. In step 66 the variable Hysteresis Counter is incremented by 1 for that blockage sensor. The maximum value that the variable Hysteresis Counter for a given sensor can attain is limited to Y+1, where Y is a specified value (e.g., Y may equal 4). Returning to step 64, once the variable Hysteresis Counter for a particular blockage sensor has been decremented by 1, control will proceed to step 68.

Step 68 is a decision diamond which checks whether the variable Hysteresis Counter for a particular blockage sensor is less than Z, where Z is a specified value (e.g., Z equals 2). If the variable Hysteresis Counter for a particular blockage sensor is less than Z, then that blockage sensor is considered to be BLOCKED. Control will proceed to step 72, wherein blockage warning signals are relayed to any user interface devices being employed by the system (e.g., display monitors, flashing LEDs). After the blockage warning signals have been relayed, the Samples Taken variable will then be reset to zero. Returning to step 66, once the variable Hysteresis Counter for a particular blockage sensor has been incremented, control will proceed to step 70.

Step 70 is a decision diamond which checks whether the variable Hysteresis Counter is greater than Y. If the variable Hysteresis Counter is greater than Y then the associated blockage sensor is considered to be NOT BLOCKED. Control will then proceed to step 72. In step 72, where the NOT BLOCKED condition exists, blockage warning signals will be discontinued if such signals were previously being relayed. The Samples Taken variable will then be reset to zero. Control will then return to step 44.

FIGS. 3A–3G are flowchart diagrams of an adaptive algorithm according to a second embodiment of the present invention for determining if seed flow blockage has occurred. This embodiment will be referred to herein as the rate-sensitive algorithm. The rate-sensitive algorithm adjusts to the seed rate automatically by the use of what are termed "state machines". This algorithm is used on each blockage sensor within the system and is independent of the other sensors (i.e., this algorithm is not header-dependent as is the primary-based adaptive algorithm). This algorithm is adaptive to seed type, seed density, fan rate and seed rate because of steps 146–160 in FIG. 3G.

The following are variables for the rate-sensitive algorithm.

Sensor Filter(SF), which is a digital low pass filter value (i.e., a smoothed value) of events for a given time period;

Sensor State (SS), which is the current sensor state for the state machine;

Current Average (CA), which is the current value of the average or smoothed number of seed events per sampling period to which the system has adapted; (In the current preferred embodiment, there are four possible blockage rates into which CA may be categorized depending on whether CA equals or exceeds three different thresholds, and these four blockage rate categories are as follows: HIGH RATE BLOCKAGE, corresponding to a threshold of 15 or more seed events per sampling period; MEDIUM RATE BLOCKAGE, corresponding to a threshold 10 or more but less than 15 seed events per sampling period; LOW RATE BLOCKAGE, corresponding to a threshold of 5 or more but less than 10 seed events per sampling period; BELOW LOW RATE BLOCKAGE, corresponding to fewer than 5 seed events per sampling period.)

Blockage Break Point (BBP) is the value the sensor filter reaches at which the system will declare a blockage sensor to be BLOCKED; (Each possible CA rate has its own BBP, for example: HIGH RATE BLOCKAGE, wherein BBP equals 30% times CA; MEDIUM RATE BLOCKAGE, wherein BBP equals 20% times CA; LOW RATE BLOCKAGE, wherein BBP equals 10% times CA; and BELOW LOW RATE BLOCKAGE, wherein BBP equals zero.)

Not Blocked Break Point (NBBP), which is the value that the sensor filter must reach when in the BLOCKED state before transitioning automatically to the UNBLOCKED state; (As one example, all the rates may have the same NBBP, such as equal to 60% times CA. The NBBP and CA are always a non-zero value except upon what is termed herein as a Change of System. A Change of System is one of the following events: On power-up of the blockage monitoring system; when the air seeder system has a ground speed of zero for more than 20 seconds; when the ground speed has decreased by more than 20% for more than 30 seconds; and when a rate of feeding seeds into the primary seed tubes has changed by more than 20% from when CA was last calculated.

Time For Event (TFE), is the variable which represents the maximum number of samples to wait for the occurrence of a single event; (If this counter expires, the system will signify the particular sensor as BLOCKED. Each of the four blockage rates above has its own TFE, such as: HIGH RATE BLOCKAGE—TFE equals 80 samples, MEDIUM RATE BLOCKAGE—TFE equals 130 samples, LOW RATE BLOCKAGE—TFE equals 200 samples, and BELOW LOW RATE BLOCKAGE—TFE equals 250 samples.)

Step 78 signals the beginning of the rate-sensitive algorithm of the air seeder blockage software. Control will proceed to step 80. In step 80, for each sensor, the variables are initialized as follows. The Sensor Filter value (SF) is set equal to zero. The current Sensor Status (SS) is set to RESEED (further defined in FIG. 3B). The Current Average (CA) is set equal to zero. The Blockage Break Point (BBP) is set equal to zero. The maximum number of samples to wait for an event (TFE) is set equal to 250. The Samples Taken value is set equal to zero. The Not Blocked Break Point (NBBP) is set equal to zero. In this example the Samples to Take value is set equal to 30. Control will then proceed to step 82, wherein the blockage sensor is sampled to determine if an event has occurred. Control will proceed to step 84.

In step 84, if a blockage sensor has registered an event, then the event counter for that blockage sensor is incremented by one. In step 84 the Samples Taken variable is also incremented by one. Control will then proceed to step 86. In step 86, if an event occurs the TFE is reset. If the TFE has expired, the current Sensor Status (SS) is set to indicate the BLOCKED STATE (further defined in FIG. 3D). Control will then proceed to step 88.

Step 88 is a decision diamond which checks if the Samples Taken variable is equal to the Samples to Take variable (e.g., 30). If the Samples Taken variable is not equal to the Samples to Take variable, then control will return to step 82. If the Samples Taken variable is equal to the Samples to Take variable, then control will proceed to step 90. Step 90 is the state machine process, in which the procedure for the current SS is called. For example, in step 80, the SS is set to equal RESEED. Therefore, the first time that the algorithm reaches step 90, the RESEED FILTER state subroutine (FIG. 3B) will be called. The subroutines of the available sensor states are further defined in FIGS. 3B through 3G. After the state machine has run through the appropriate state subroutines, control will proceed to step 92. In step 92 the Samples Taken value is reset and control returns to step 82.

Figure 3A:
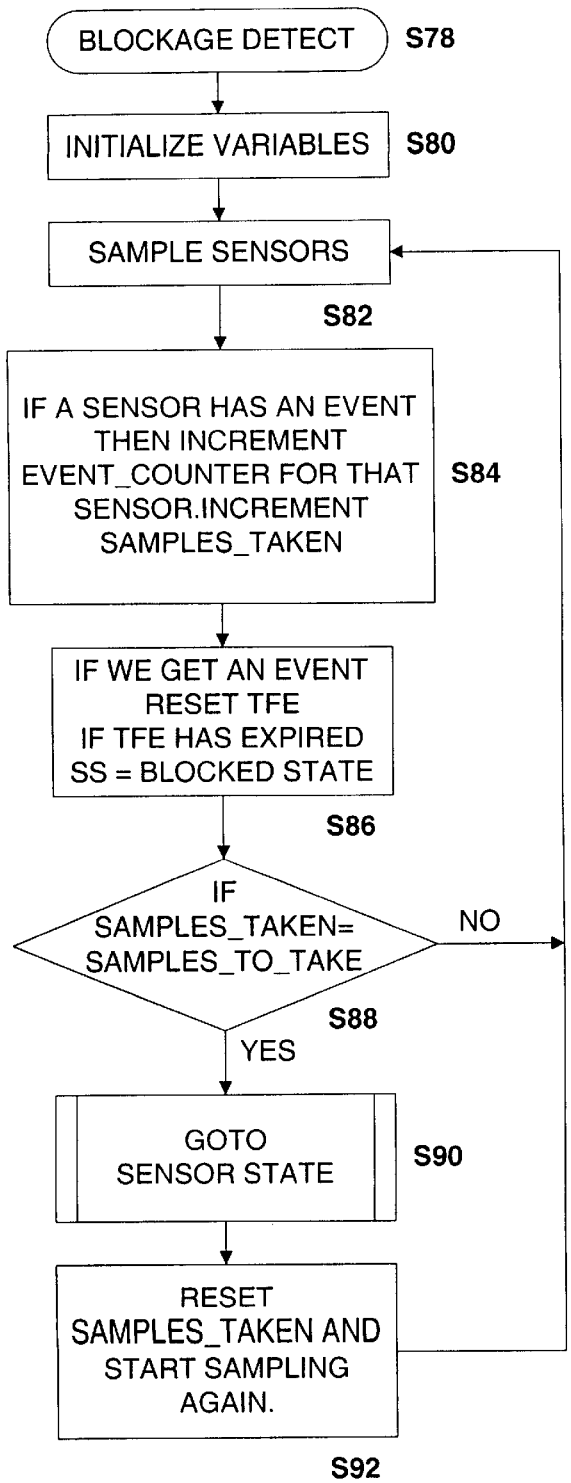
FIG. 3A is a flowchart diagram of an adaptive algorithm according to a second embodiment of the present invention and is termed the "rate-sensitive algorithm". This algorithm is useful for determining if seed flow blockage has occurred in one or more of secondary seed tubes that are attached to a header and receive seeds from a primary seed tube.
Figure 3B:
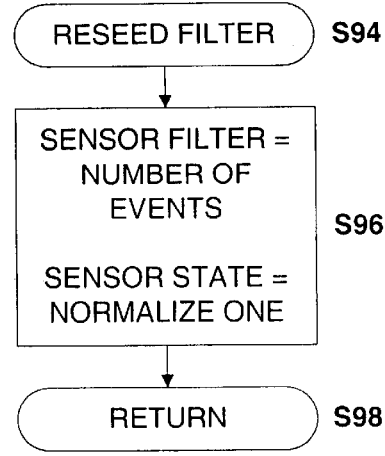
FIG. 3B is a flowchart diagram of what is termed herein as the RESEED FILTER state subroutine of the rate-sensitive algorithm.

FIG. 3B is a flowchart diagram depicting the RESEED FILTER state subroutine of the state machine for the rate-sensitive algorithm. Step 94 signals the beginning of RESEED FILTER state subroutine. Control will proceed to step 96. In step 96 the Sensor Filter is set equal to the number of events that have been received during the sampling (in FIG. 3A) from step 82 through step 88. The Sensor State is set equal to the NORMALIZE ONE state (further defined in FIG. 3C). Control will then proceed to step 98, which signals the return of the state subroutine to step 92 of FIG. 3A.

Figure 3C:
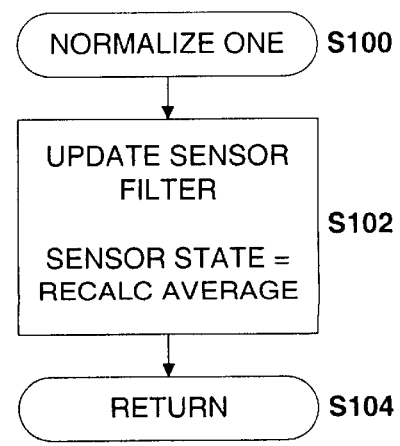
FIG. 3C is a flowchart diagram of what is termed herein as the NORMALIZE ONE state subroutine of the rate-sensitive algorithm.

FIG. 3C is a flowchart diagram depicting the NORMALIZE ONE state subroutine of the state machine for the rate-sensitive algorithm. Step 100 signals the beginning of NORMALIZE ONE state subroutine. Control will proceed to step 102. In step 102 the Sensor Filter value is updated. Updating the Sensor Filter value is a smoothing process that uses a low-pass digital filter. The new data (number of events) has less influence on the result than the original data (Sensor Filter value). The Sensor State is set equal to the RECALC AVERAGES state. Control will then proceed to step 104 which signals the return of the state subroutine to step 92 of FIG. 3A.

Figure 3D:
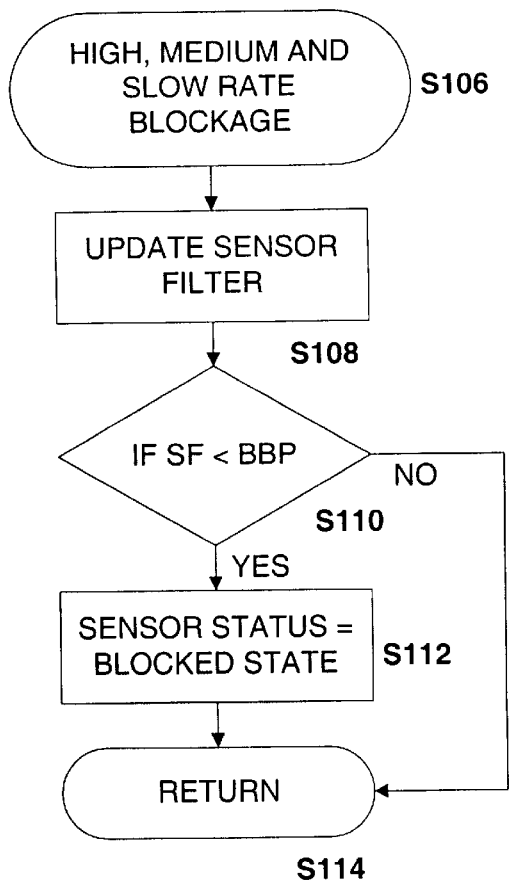
FIG. 3D is a flowchart diagram of what is termed herein as the HIGH, MEDIUM, and LOW RATE BLOCKAGE state subroutine of the rate-sensitive algorithm.

FIG. 3D is a flowchart diagram depicting the HIGH, MEDIUM, and LOW RATE BLOCKAGE state subroutine of the state machine for the rate-sensitive algorithm of FIG. 3A. Step 106 signals the beginning of the HIGH, MEDIUM, and LOW RATE BLOCKAGE state subroutine. Control will proceed to step 108. In step 108 the Sensor Filter value is updated. Control will then proceed to step 110. Step 110 is a decision diamond which checks if the Sensor Filter value (SF) is less than the Blockage Break Point (BBP). If this is true, then control will proceed to step 112. In step 112 the Sensor Status (SS) is set equal to the BLOCKED STATE. Control will then proceed to step 114. Returning to step 110, if the SF is not less than the BBP, then control will proceed to step 114. Step 114 signals the return of this state subroutine to step 92 of FIG. 3A.

Figure 3E:
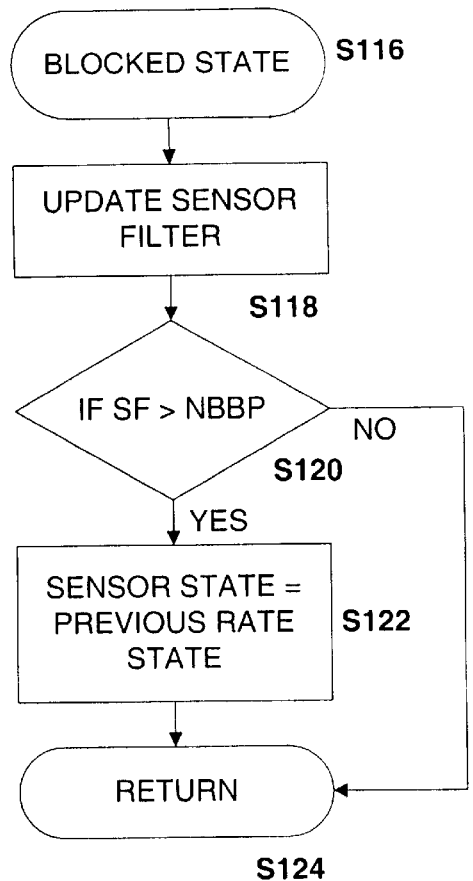
FIG. 3E is a flowchart diagram of what is termed herein as the BLOCKED STATE subroutine of the rate-sensitive algorithm.

FIG. 3E is a flowchart diagram depicting the BLOCKED STATE subroutine of the state machine for the rate-sensitive algorithm of FIG. 3A. Step 116 signals the beginning of the BLOCKED STATE subroutine. Control will proceed to step 118. In step 118 the Sensor Filter value is updated. Control will then proceed to step 120.

Step 120 is a decision diamond which checks if the Sensor Filter value (SF) is greater than the Not Blocked Break Point (NBBP). If this is true, then control will proceed to step 122. In step 122 the Sensor State is set equal to the previous rate state (HIGH, MEDIUM, LOW, OR BELOW LOW RATE), signaling that the blockage sensor is no longer blocked. Control will then proceed to step 124. Returning to step 120, if the SF is not greater than the NBBP, then control will proceed to step 124. Step 124 signals the return of this state subroutine to step 92 of FIG. 3A.

Figure 3F:
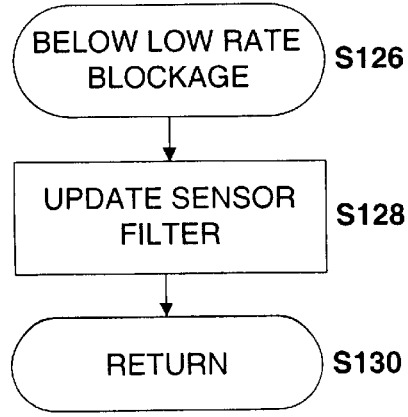
FIG. 3F is a flowchart diagram of what is termed herein as the BELOW LOW RATE BLOCKAGE state subroutine of the rate-sensitive algorithm.

FIG. 3F is a flowchart diagram depicting the BELOW LOW RATE BLOCKAGE state subroutine of the state machine for the rate-sensitive algorithm of FIG. 3A. Step 126 signals the beginning of the BELOW LOW RATE BLOCKAGE state subroutine. Control will proceed to step 128. In step 128 the Sensor Filter value is updated. Control will then proceed to step 130. Step 130 signals the return of this state subroutine to step 92 of FIG. 3A.

Figure 3G:
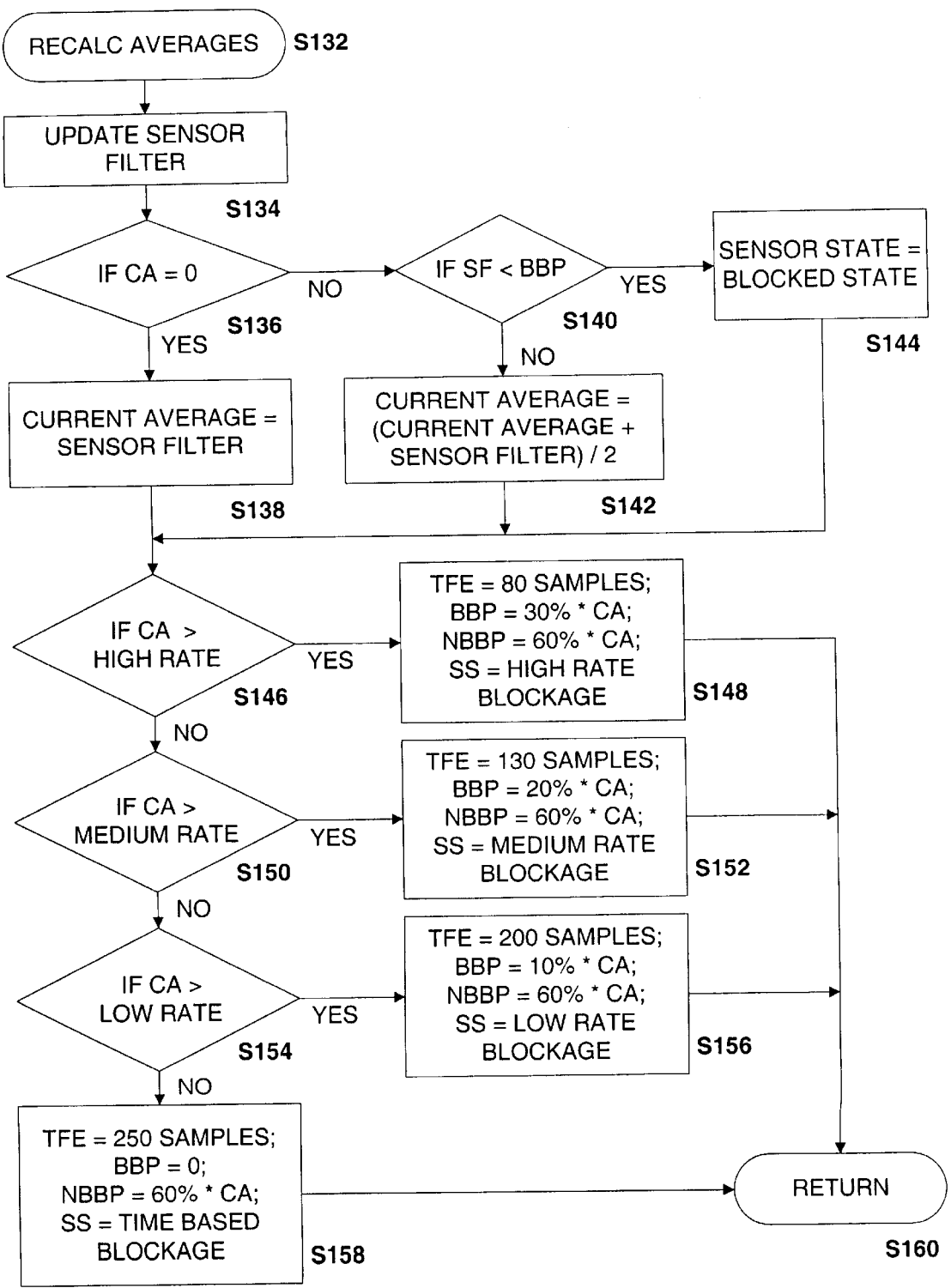
FIG. 3G is a flowchart diagram of what is termed herein as the RECALC AVERAGES state subroutine of the rate-sensitive algorithm.

FIG. 3G is a flowchart diagram depicting the RECALC AVERAGES state subroutine of the state machine for the rate-sensitive algorithm of FIG. 3A. Step 132 signals the beginning of the RECALC AVERAGES state subroutine. Control will proceed to step 134. In step 134 the Sensor Filter value is updated. Control will then proceed to step 136.

Step 136 is a decision diamond which checks if the Current Average (CA) equals zero. CA will equal zero only on the first occasion that the RECALC AVERAGES state subroutine is called. The RECALC AVERAGES state subroutine will be called on each Change of System, (i.e., at power-up of the blockage monitoring system, when the ground speed of the air seeder system is zero for more than 20 seconds, when the ground speed of the system has decreased by more than 20 percent since the last time CA was calculated, or when a rate of feeding seeds into the primary seed tubes has changed by more than 20% from when CA was last calculated. If CA equals zero, then control will proceed to step 138. In step 138 the Current Average is set equal to the current value of Sensor Filter. Returning to step 136, if CA is not equal to zero, then control will proceed to step 140.

Step 140 is a decision diamond which checks if the Sensor Filter value (SF) is less than the Blockage Break Point (BBP). If SF is not less than BBP, control will proceed to step 142. In step 142, the Current Average (CA) is set equal to the value of (previous CA+SF)/2. Returning to step 140, if the Sensor Filter value (SF) is less than the Blockage Break Point (BBP), then control will proceed to step 144. In step 144 the Sensor State is set to indicate the BLOCKED STATE. At this point, step 138, step 142, and step 144 all proceed to step 146. As mentioned previously, steps 146–160 enable the rate-sensitive algorithm to automatically adapt to different seed types, seed densities, fan speeds or seed rates.

Step 146 is a decision diamond which checks if the Current Average (CA) is greater that the HIGH RATE threshold (e.g., 15). If this is true, then control will proceed to step 148. In step 148 the Time for an Event (TFE) is set equal to that for HIGH RATE BLOACKAGE (e.g., 80 samples). The Blockage Break Point (BBP) is set equal to 30 percent times the Current Average (CA). The Not Blocked Break Point (NBBP) is set equal to 60 percent times the Current Average (CA). The Sensor Status (SS) is set to the HIGH RATE BLOCKAGE state. Returning to step 146, if the Current Average (CA) is less than the HIGH RATE BLOCKAGE threshold (e.g., 15) then control will proceed to step 150.

Step 150 is a decision diamond which checks if the Current Average (CA) is greater than the MEDIUM RATE BLOCKAGE threshold (e.g., 10). If so, then control will proceed to step 152. In step 152 the Time for an Event (TFE) is set equal to that for MEDIUM RATE BLOCKAGE (e.g., 130 samples). The Blockage Break Point (BBP) is set equal to 20 percent times the Current Average (CA). The Not Blocked Break Point (NBBP) is set equal to 60 percent times the Current Average (CA). The Sensor Status (SS) is set to the MEDIUM RATE BLOCKAGE state. Returning to step 150, if the Current Average (CA) is less than the MEDIUM RATE BLOCKAGE threshold (e.g., 10) then control will proceed to step 154.

Step 154 is a decision diamond which checks if the Current Average (CA) is greater that the LOW RATE BLOCKAGE threshold (e.g., 5). If this is true, then control will proceed to step 156. In step 156 the Time for an Event (TFH) is set equal to that for LOW RATE BLOCKAGE (e.g., 200 samples). The Blockage Break Point (BBP) is set equal to 10 percent times the Current Average (CA). The Not Blocked Break Point (NBBP) is set equal to 60 percent times the Current Average (CA). The Sensor Status (SS) is set to the LOW RATE BLOCKAGE state. Returning to step 154, if the Current Average (CA) is less than the LOW RATE Blockage threshold (e.g., 5) then control will proceed to step 158. In step 158, the Time for an Event (TFH) is set equal to that for BELOW LOW RATE BLOCKAGE (e.g., 250 samples). The Blockage Break Point (BBP) is set equal to zero. The Not Blocked Break Point (NBBP) is set equal to 60 percent times the Current Average (CA). The Sensor Status (SS) is set to the BELOW LOW RATE BLOCKAGE state. At this point, all paths will proceed to step 160. Step 160 signals the return of the state subroutine to step 92 of FIG. 3A.

What is claimed is:

1. In a computer-implemented method of determining if seed flow blockage has occurred in an air seeder blockage monitoring system, wherein the rate of seed flow is monitored in a seed flow path and a seed flow blockage is determined as occurring if the seed flow rate is below a given threshold, or decreases a certain amount in a given time period or during a given distance traveled by the air seeder, the improvement of making the determination of seed flow blockage automatically adaptive to changes in seed type, seed density, fan rate or seed rate, wherein the improvement of making the determination of seed flow blockage automatically adaptive to changes in seed type, seed density, fan rate or seed rate comprises varying, depending on the number of seeds detected in said seed flow path in a given time interval, the number of samples that must be taken for a sensor before the method determines that a seed flow blockage has occurred in a seed path.

2. In a computer-implemented method of determining if seed flow blockage has occurred in an air seeder blockage monitoring system, wherein the rate of seed flow is monitored in a seed flow path and a seed flow blockage is determined as occurring if the seed flow rate is below a given threshold, or decreases a certain amount in a given time period or during a given distance traveled by the air seeder, the improvement of making the determination of seed flow blockage automatically adaptive to changes in seed type, seed density, fan rate or seed rate, wherein the improvement of making the determination of seed flow blockage automatically adaptive to changes in seed type, seed density, fan rate or seed rate comprises automatically varying, depending on the number of seeds detected in said path in a given time interval, a criterion of the maximum number of samples to wait for the occurrence of a seed event before the method determines that a seed flow blockage has occurred.

3. In a computer-implemented method of determining if seed flow blockage has occurred in an air seeder blockage monitoring system, wherein the rate of seed flow is monitored in a seed flow path and a seed flow blockage is determined as occurring if the seed flow rate is below a given threshold, or decreases a certain amount in a given time period or during a given distance traveled by the air seeder, the improvement of making the determination of seed flow blockage automatically adaptive to changes in seed type, seed density, fan rate or seed rate, wherein the improvement of making the determination of seed flow blockage automatically adaptive to changes in seed type, seed density, fan rate or seed rate comprises automatically varying, depending on the number of seeds detected in said path in a given time interval, a criterion value that a sensor filter must reach when in a BLOCKED state before transitioning automatically to the UNBLOCKED state.

* * * * *